(12) United States Patent
Dasgupta et al.

(10) Patent No.: US 6,868,037 B2
(45) Date of Patent: Mar. 15, 2005

(54) USE OF DRILL BIT ENERGY FOR TOMOGRAPHIC MODELING OF NEAR SURFACE LAYERS

(75) Inventors: Shivaji Dasgupta, Dhahran (SA); Aldo Vesnaver, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 35 days.

(21) Appl. No.: 10/641,369

(22) Filed: Aug. 13, 2003

(65) Prior Publication Data

US 2004/0073370 A1 Apr. 15, 2004

Related U.S. Application Data

(60) Provisional application No. 60/405,081, filed on Aug. 20, 2002.

(51) Int. Cl.[7] .............................. G01V 1/40; G01V 1/36
(52) U.S. Cl. .............................. 367/54; 367/40; 367/42; 367/57; 367/73
(58) Field of Search .............................. 367/25, 27, 40, 367/42, 54, 57, 73; 702/6

(56) References Cited

U.S. PATENT DOCUMENTS

| | | | | |
|---|---|---|---|---|
| 5,103,429 A | * | 4/1992 | Gelchinsky | 367/38 |
| 5,109,947 A | * | 5/1992 | Rector, III | 367/57 |
| 5,151,882 A | * | 9/1992 | Kingman | 367/73 |
| 5,191,557 A | * | 3/1993 | Rector et al. | 367/57 |

* cited by examiner

Primary Examiner—Ian J. Lobo
(74) Attorney, Agent, or Firm—Abelman, Frayne & Schwab

(57) ABSTRACT

A method for tomographic modeling of seismic wave travel times from well drilling records generated by drill string vibrations during drilling and identifying in the recorded vibration at least one of direct, reflected, refracted, converted and diving waves so as to measure wave velocity in near surface layers.

18 Claims, 14 Drawing Sheets

USE OF DRILL BIT ENERGY FOR TOMOGRAPHIC MODELING OF NEAR SURFACE LAYERS

RELATED APPLICATION

This application claims benefit of U.S. Provisional Application No. 60/405,081, filed Aug. 20, 2002.

FIELD OF THE INVENTION

This invention relates to an improved method of estimating near surface weathering and sub weathering layer boundaries and the seismic velocities therein by the use of seismic waves emanating from a working drill bit in a well. More specifically, a method utilizes the travel times of seismic waves from a drill bit source for computer tomographic modeling of the near surface layers and velocities in areas of lateral velocity heterogeneities.

BACKGROUND OF THE INVENTION

In many arid regions like Saudi Arabia, the near surface velocity of seismic waves in the shallowest few hundred meters varies significantly due to variations in the rocks encountered in these shallow geological layers. Such variations include, for example, sand dunes, buried caverns filled with sand and the sporadic occurrence of high velocity anhydrite lenses. Because wells drilled through these shallow layers are not generally logged, these heterogeneities are not sufficiently sampled and their effects are unaccounted for in correcting 3D surface seismic data. This often results in a distortion of the image of the objective horizons at the reservoir zones obtained from 3D surface seismic recording. Due to such distortions or false structures, many wells for field development have been drilled at poor locations caused by local near-surface velocity anomalies.

Compensating for these anomalies is an extremely challenging problem. In the past, when only 2D seismic data were acquired, shallow "up-holes" were drilled along the 2D lines. Explosives detonated on the surface or, alternatively, a mechanical source like a weight drop provided the seismic source that was detected in geophones or seismic sensors lowered to various measured depths in the drilled up holes. This experiment provided a time delay for the seismic source to be detected at the receivers. These time-depth measurements sampled the near surface velocity variations at drilled up-hole locations. From these measurements, near surface velocity models were constructed along the 2D seismic line profiles where several upholes were drilled at regular distances from each other.

This is an expensive, albeit effective, tool for measuring the velocity in the shallow layers. It is the extensive areal coverage of modern 3D surveys that makes adequate uphole control that is necessary for shallow velocity modeling very expensive. Accordingly, there is a need for a more economical technique to sample the velocities.

There are known techniques called "seismic while drilling" (SWD) technology. These techniques and their corresponding equipment have been developed to record seismic data produced by the drill bit as it penetrates the rocks. The use of seismic waves generated by a drill bit while drilling a borehole has been disclosed in various U.S. patents, e.g. U.S. Pat. Nos. 2,062,151; 4,954,998; 4,964,087; 4,965,774; 5,248,857; and 5,511,038.

In the previously described seismic source-receiver systems, the time delay is recorded measured from the initiation of the source. However, in SWD the seismic signal produced by the drill bit in the borehole is a continuous signal that propagates through the earth formations and is detected by an array of sensors on the ground surface. The continuous signal has no reference zero time break.

However, the continuous drill bit signal also propagates along the steel drill string assembly to the surface and this can be detected using accelerometers mounted on a swivel joint above the drill pipe. This has been discussed in U.S. Pat. No. 4,718,048 and European Patent 0273 722. Also, U.S. Pat. Nos. 4,365,322 and 5,050,130 describe the use of these continuous seismic signals from the drill bit in data processing.

The zero time or the instant of emission of seismic elastic waves from the drill bit is obtained by comparing the signals recorded on the drill-string with those recorded on the surface sensors. These two signals propagate along two distinct paths. Processing consists of cross correlating the signal propagating through the earth layers with the signal propagating along the drill string.

Under any of the prior art discussed above, the seismic signals emanated from a working drill bit have not been applied for providing weathering, sub weathering or the near surface layering model or in deriving a tomographic velocity model for the correction of surface 3D seismic data. The joint inversion of different elastic wave types from SWD data for near-surface characterization is hitherto unknown.

SUMMARY OF THE INVENTION

The object of the present invention is to apply the processed seismic data from the prior art for detailed tomographic modeling of weathering and sub weathering or the near surface layers. 3D tomographic models created therefrom would provide the basis of accurate near surface correction of 3D surface seismic data.

The present invention provides a method and a system for acquiring and utilizing the delay time recorded for different modes of seismic signals from a working drill bit source. The near surface layers and velocities are obtained by computer tomographic modeling of the shallow weathered, sub weathered layers. The drill bit is the source that generates elastic waves, detected on the ground surface using a plurality of sensors at various distances from the well location and in different azimuth directions. The reference signal is recorded by accelerometers mounted on a Kelly busing of the drill string. The sensors used are tri-axial or 3-component receivers that detect the axial and torsional waves emanated from the drill bit vibration.

The reference signal from the accelerometers is cross-correlated with the surface geophone signal to obtain processed seismic records for pressure waves (P-waves) and shear waves (S-waves). These different wave types may be either generated directly from the bit or converted at some elastic rock interfaces.

The use of arrival times of different seismic wave types from the drill bit source for tomographic modeling of near surface weathering and sub weathering layers is novel. The method generally comprises the steps of recording drill string vibrations by locating seismic energy from the drill bit as the drill bit penetrates through rock layers in the near surface of the earth in the vicinity of the borehole, using three-component seismic sensors deployed on the ground surface, and identifying in the recorded and cross correlated data at least one type of direct, reflected, refracted or converted elastic wave. The measured travel times are used to develop a near surface replacement model by joint tomographic inversion of these different propagation modes.

The replacement model is applied in correcting surface seismic data in 3D.

These and other objects, features and advantages of the present invention will be apparent from the following detailed description of the preferred embodiments taken in conjunction with the following drawings.

DETAILED DESCRIPTION OF THE PREFERRED EMBODIMENTS

Figure 1:
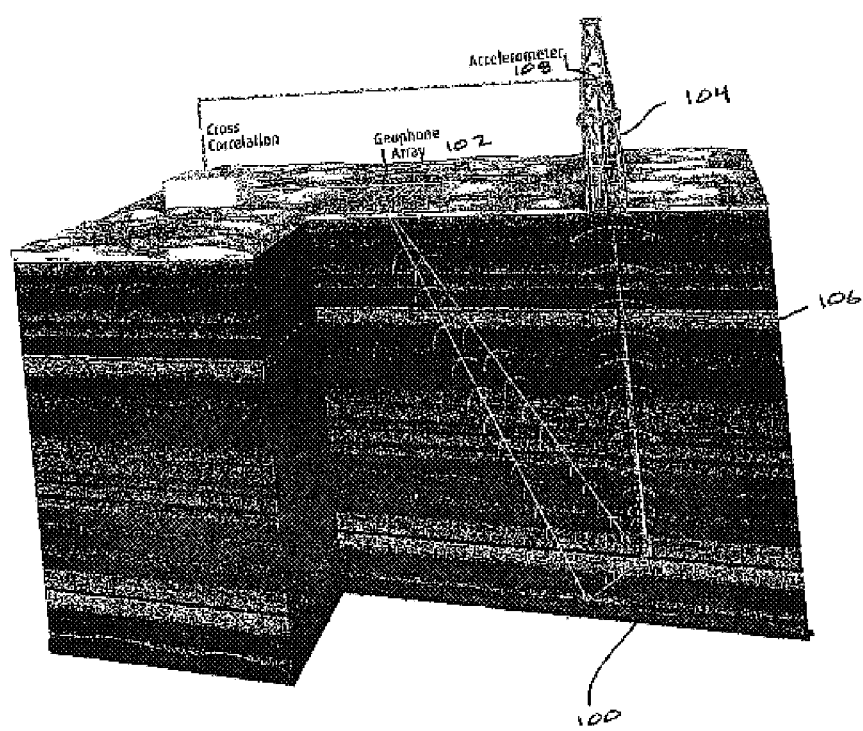
FIG. 1 is a schematic representation of the SWD data acquisition system.

As described above, in SWD the drill bit, while drilling the rock formation, produces a seismic source at its deepest point by abrading and boring through the rocks and induces acoustic energy radially from the borehole and in all other directions. As the waves penetrate the shallow layers, the delay times for direct waves from the source to the receivers on the surface are detected. In addition, the waves reflected from rock layer interfaces below the drill bit are recorded on the same receivers. As the drilling progresses, each seismic data point is acquired from a source at a greater depth than before. The direct travel times to the formations encountered by the drill bit and the reflected times from formations below the drill bit are detected. The travel times of direct and reflected arrivals at each geophone location for various azimuths are recorded at closely spaced depth intervals for several wells drilled in an area.

These times are used in a joint tomographic travel-time inversion of the arrivals of direct, reflected, refracted and converted waves. According to the method of the present invention, the travel times from one or more of these wave types are obtained at all receivers with very fine depth spacing as drilling proceeds. The spatial sampling is obtained by deploying closely spaced receivers, for example along radial patterns centered at the well location. The distance to the farthest surface receiver from the wellhead is set to be at least equal to the maximum depth of the near surface layers to be investigated by tomographic inversion.

Wells drilled for reservoir development in oil and gas fields are usually distributed areally over the field areas. The travel times from SWD acquisition for these development wells provide an areal sampling of data points over the field area. Travel time inversion of direct, reflected, refracted and converted signals from SWD recorded data in a plurality of wells in the area provides a 3D model of complex near surface geology and the local velocity changes. This would improve the imaging of the deeper reservoir objectives on surface 3D seismic data.

Since SWD allows a continuous measurement, the technique ensures a much finer sampling in depth than is usually obtained from uphole data, where only a few surface source and down-hole receiver points are economically feasible. The spatial resolution is also improved in SWD by placing a plurality of seismic sensors at close spacings in various azimuth directions around each well. This combination of fine spatial sampling both laterally and vertically improves the seismic ray density and the angular coverage in SWD. The increased ray density improves the stability of the tomographic inversion through a larger statistical averaging of the input data. The angular coverage makes the tomographic equations more independent, thus reducing the possible non-uniqueness of their solution. The time-depth sampling for the near surface layers at the drilling wells avoids the above-described difficulties of the prior art.

There are several advantages to using different wave types. First, the signal/noise ratio or interpretability of different wave types changes according to the offset between the source at the well and the receiver. Thus, one can get more data for better defining the Earth features by picking various events, each one within the area where its reliability is adequate.

Second, the ray paths are quite different among the reflected arrivals (mostly vertical), direct or diving wave arrivals (mostly horizontal) and head waves (partly nearly vertical, partly nearly horizontal). Even converted waves (being more asymmetric than non-converted ones) contribute to the ray path variety. The geometric differences result in less linearly dependent equations in the inversion algorithm, and thus in a more stable and reliable estimate of local velocity anomalies.

Third, the better ray path distribution makes the estimated velocity field in near surface layers more meaningful from the physical point of view. In seismic tomography, ray paths approximate the propagation of seismic waves, which have a significant spatial extension expressed by the Fresnel volume. This approximation is better when the inversion process can average the travel time changes along many different ray paths, spatially distributed over extended domains.

FIG. 1 is a schematic representation of SWD data acquisition, wherein the vibrations and abrasion of the rocks by the rotating drill bit 100 acts as a downhole seismic energy source. Some of the energy travels through the near surface layers and is detected by geophone arrays 102 at offset locations from the well 104. The vibrations are also transmitted along the drill string 106 and detected on sensors (accelerometers) 108 mounted on the swivel joint above the drill string 106. Some of the energy radiates downwards ahead of the drill bit 100, where it may be reflected from rock interfaces due to the impedance contrasts in the subsurface rock layers.

Figure 2:
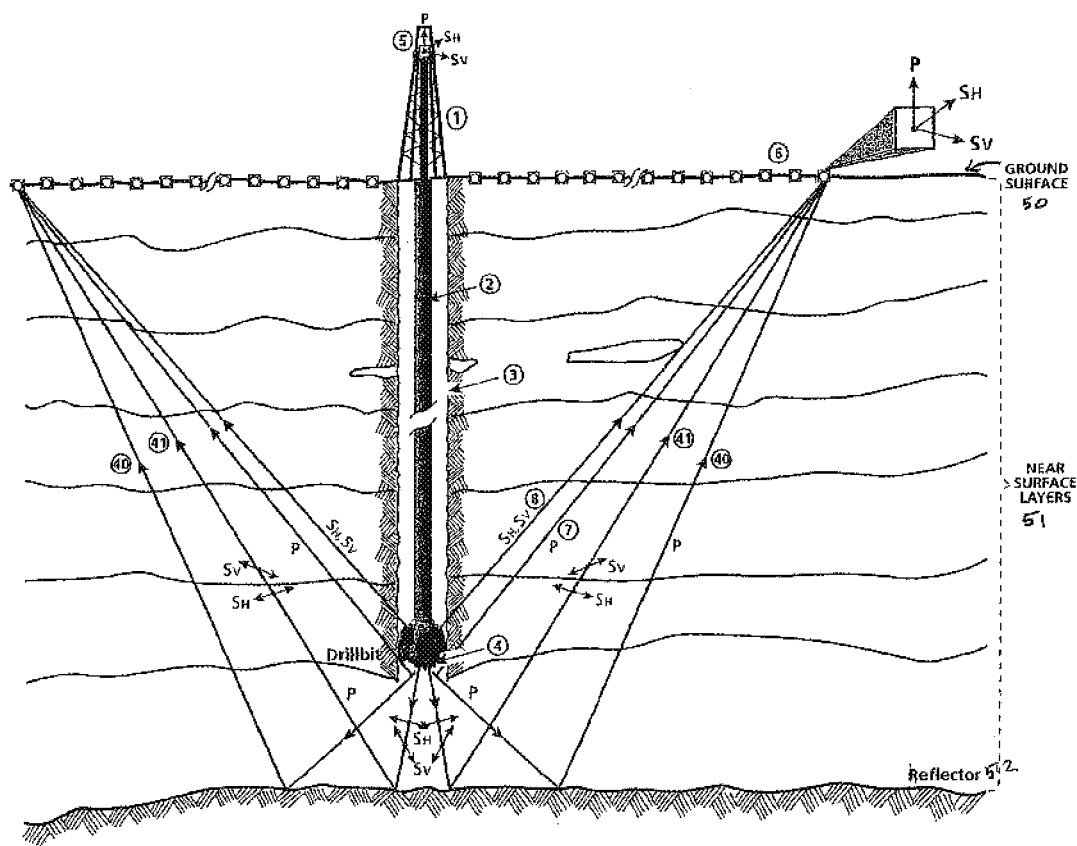
FIG. 2 illustrates the deployment of apparatus for SWD data acquisition.

FIG. 2 is a partial schematic illustration of the apparatus deployed in the invention. It is a vertical section schematically representing deployment of the apparatus for estimating near surface velocities.

The well drilling support equipment includes a drill rig 1 shown on the ground surface and a drill string 2 extending from the drill rig 1 below the ground surface inside the well bore 3 that is being drilled. The drill string 2 is made up of steel pipe joints that are threaded together and can be extended in length by threading together additional drill pipes. A rotary table mounted on the drill rig 1 drives a conventional tricone drill bit 4 at the end of the drill string 2. As the drill bit 4 penetrates the rock layers, its cutting action generates elastic wave vibrations that radiate out in spherical patterns.

A triaxial sensor 5 with one longitudinal and two orthogonal horizontal accelerometers is clamped on the swivel joint above the drill string 2. The sensor 5 detects axial and torsional vibrations (P, $S_H$ and $S_V$) transmitted along the drill string 2. This provides the reference signal for processing.

In accordance with the present invention, an array of triaxial seismometers or geophones 6 is planted on the ground surface 50. As shown in the expanded view, each geophone location includes a triaxial geophone 6 with one vertical sensor for P-waves and two horizontal sensors for shear waves $S_H$ and $S_V$ sensors. The longitudinal or P-wave ray path 7 and the transverse or S-wave ray path 8 $S_H$ and $S_V$ emanating from the drill bit 4 propagate directly through the near surface layers and are detected by the geophones 6 along the ray paths shown on the schematic of FIG. 2. The S-waves are polarized in $S_H$ and $S_V$ modes and propagate through the earth to the surface geophones 6. Some of the drill bit vibration signals are reflected from below the drill bit 4 off of near surface layer interfaces such as reflector 52 and travel as a reflected P-wave along ray path 40 and as reflected S-waves $S_H$ and $S_V$ along ray path 41 to the geophones 6 planted on the ground surface 50.

Figure 3:
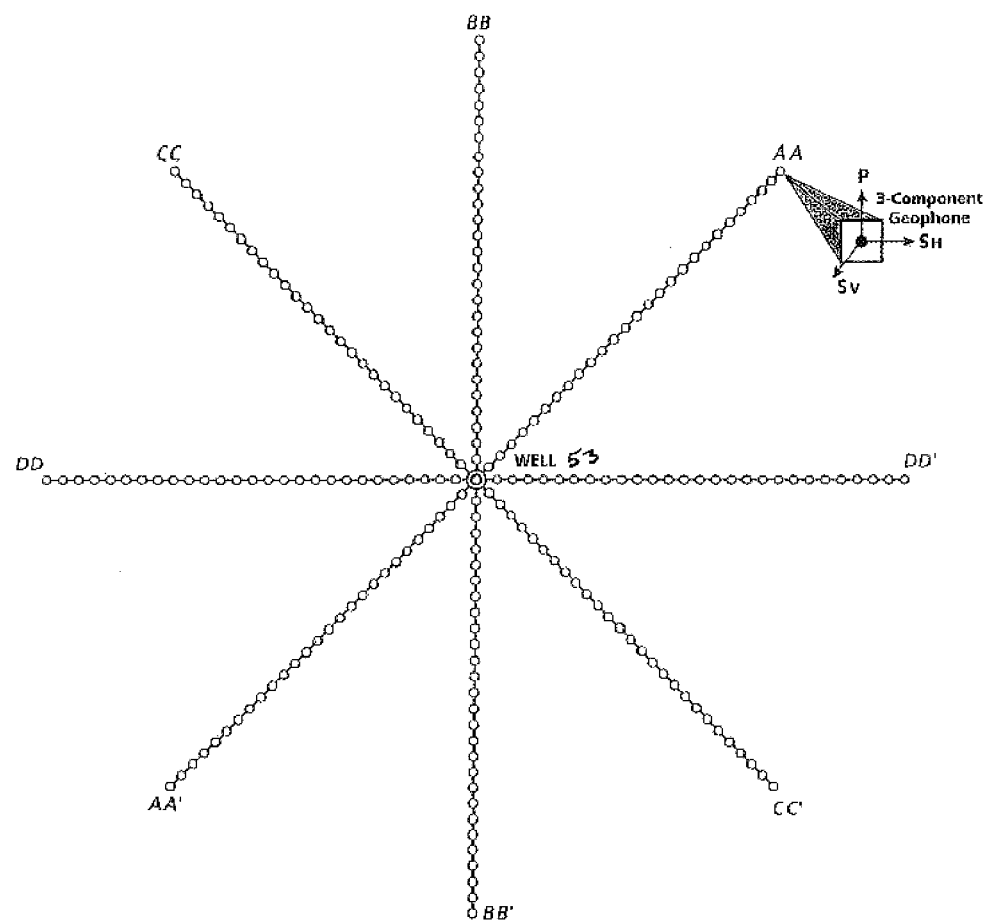
FIG. 3 is a map view of the surface layout of geophones in a radial geometry from a well.

FIG. 3 shows in map view an advantageous layout geometry of the triaxial geophones 6. Here the geophones 6 are planted on the ground surface 50 with radial symmetry from the well location 53 in various azimuths. The total distance to the farthest geophone 6 from the wellhead is advantageously set to be at least equal to the maximum depth of investigation of the near surface layers. As shown in the expanded view, each geophone 6 consists of three elements for detecting vertical and horizontal components. Such geophones 6 are conventional elements. Signals from each geophone are recorded in separate channels.

Figure 4:
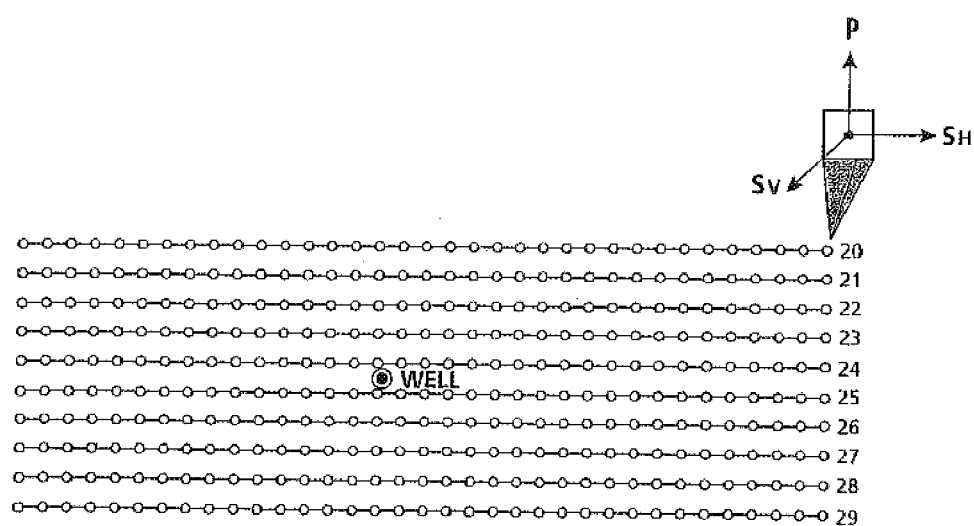
FIG. 4 is a map view of the surface layout of geophones in a parallel line geometry.

FIG. 4 shows in map view an alternative advantageous layout geometry of the triaxial geophones 6. Here the geophones 6 are planted along parallel lines 20–29 near the well. The spacing between the surface geophones is advantageously five meters or less, which provides high ray density coverage.

Each triaxial geophone in any layout could be replaced by a plurality of similar triaxial geophones, connected together electrically. The vertical sensor in each triaxial geophone detects longitudinal or P-waves arriving on the ground surface, and the two horizontal sensors placed orthogonal to each other detect shear waves polarized in $S_H$ and $S_V$ with horizontal particle motion of waves orthogonal to each other.

Figure 5:
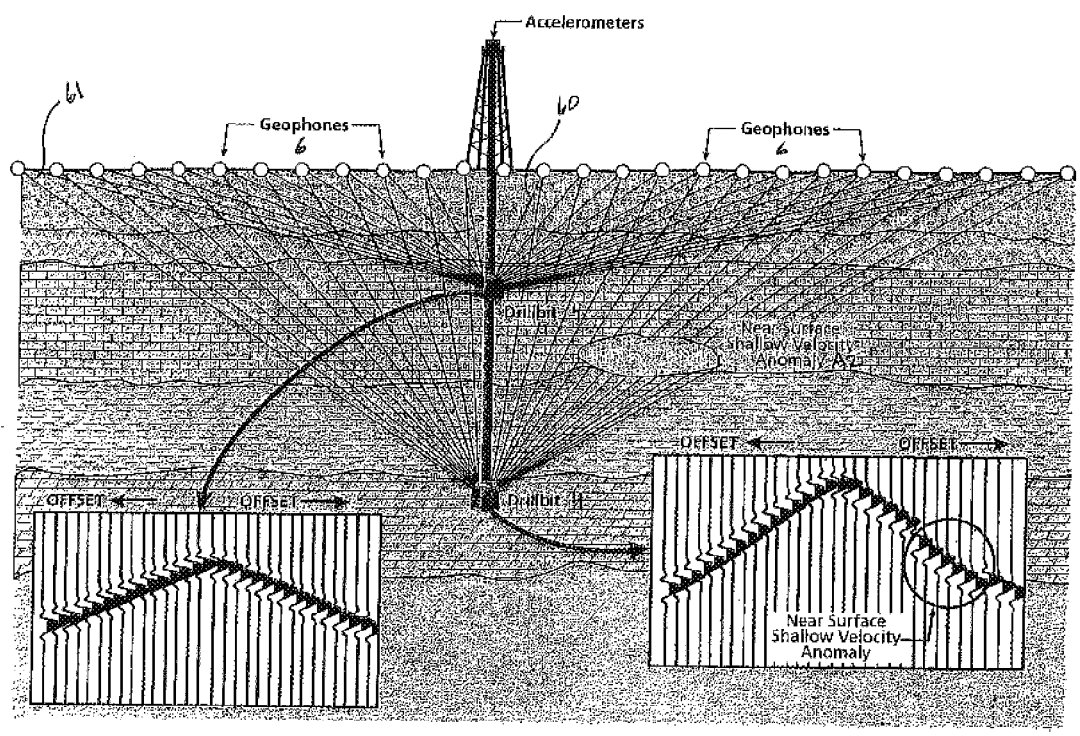
FIG. 5 is a schematic illustration of SWD data in a near surface velocity anomaly.

FIG. 5 is a schematic that shows the effect of a near surface or shallow velocity anomaly on the seismic records. With the drill bit 4 (shown in two positions) generating seismic energy as it penetrates the rock layers, the first wave to arrive is the direct wave from the drill bit 4 to the geophone 6 closest to the well 53 or at the shortest offset, e.g. path 60. The longer offsets, e.g. path 61, receive the energy at a later time. As the drill bit 4 penetrates through geological bodies that cause near surface velocity anomalies (similar to anomaly A2 shown in the figure), the seismic waves passing through the anomaly A2 are distorted, as seen in the record on the right. For the shallow record to the left, before the drill bit has penetrated the anomaly A2, the seismic record shows no anomalous signature.

Figure 6:
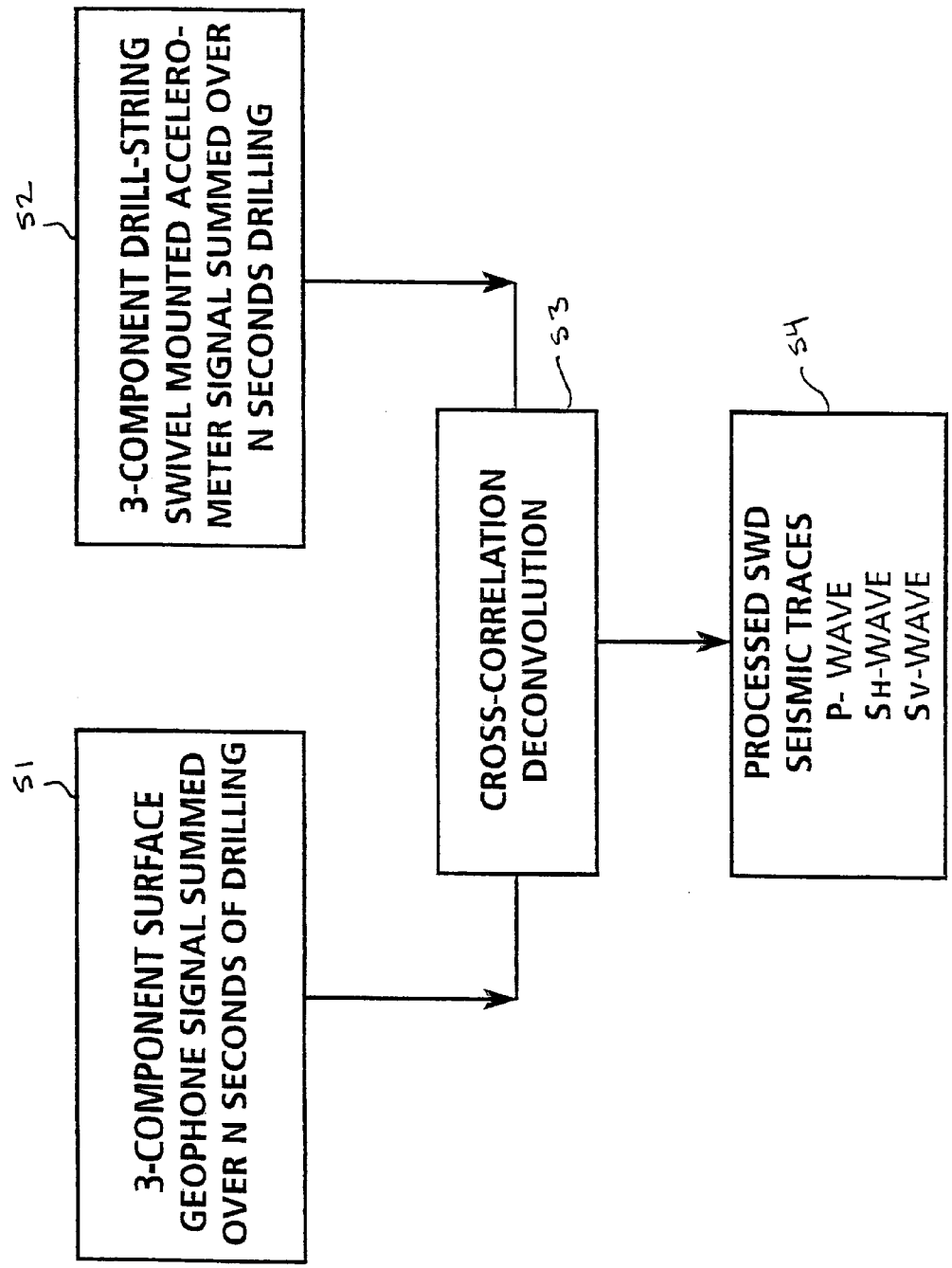
FIG. 6 is a flowchart showing the acquisition and processing of SWD data.

FIG. 6 is a flowchart depicting the recording and signal processing of the SWD data. As drilling progresses, the drill bit 4 advances through the rocks and generates seismic signals that are sequentially summed (or stacked) in step S1 to superimpose the recorded energy. The summed seismic energy over some minutes of drilling (but within a few meters of drill depth advance) is recorded by the geophones on the ground surface. Similarly, the seismic energy arriving at the accelerometers on the drill string swivel is recorded in step S2. Seismic records from the geophones are cross-correlated with the reference signals from the accelerometers in step S3. A deconvolution or inverse filter is then applied to the data. After correcting for the layout geometry of the geophones, the arrival times of at least one of the direct, reflected, refracted and converted waves in the processed seismic data for each geophone station are picked in step S4.

Figure 7:
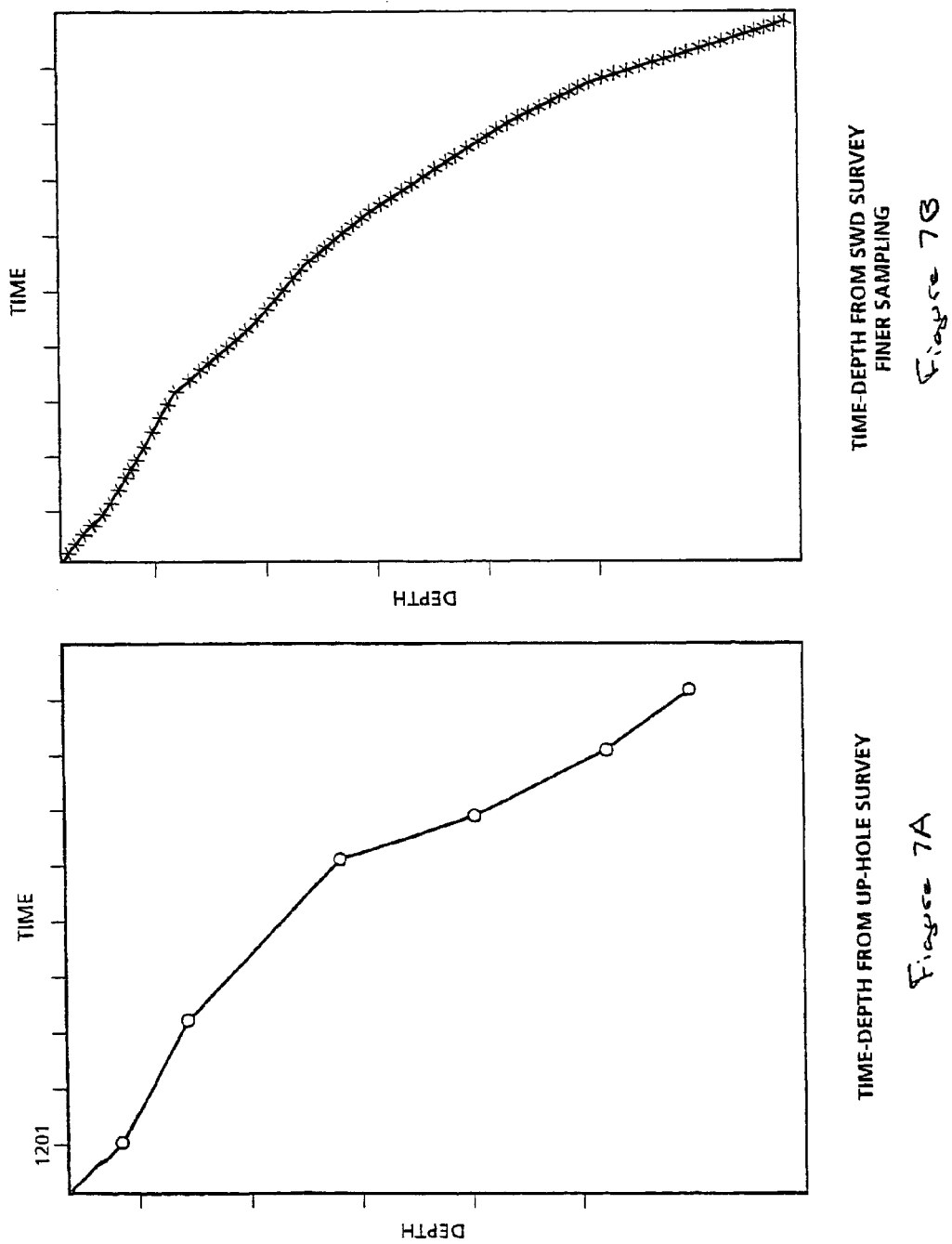
FIGS. 7A and 7B are a comparison of "prior art" uphole time-depth measurements with SWD near surface time-depth measurements.

FIG. 7A shows time-depth pairs (on the left) obtained from uphole data. This "prior art" shows only a few control points. In contrast, in FIG. 7B the time-depth pairs from SWD measurement (on the right) provide hundreds of time-depth measurements for the same depth.

Figure 8:
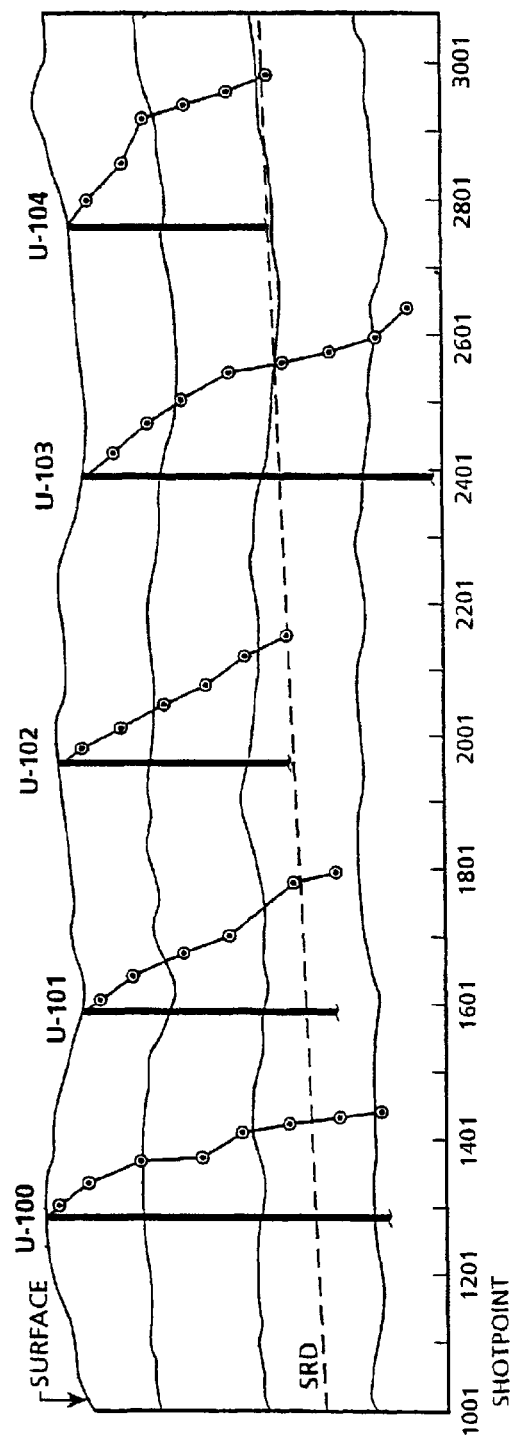
FIG. 8 illustrates a near surface model from "prior art" uphole time-depth data.

FIG. 8 shows a cross section for the "prior art" technique for a near surface model using the time-depth data from upholes drilled along a 2D profile. Such models are used in correcting the 2D seismic profiles for propagation effects across shallow anomalies. The present invention is an improvement over this technique and uses a tomographic approach to deriving the replacement velocity model in three dimensions for correcting 3D seismic data.

Figure 9:
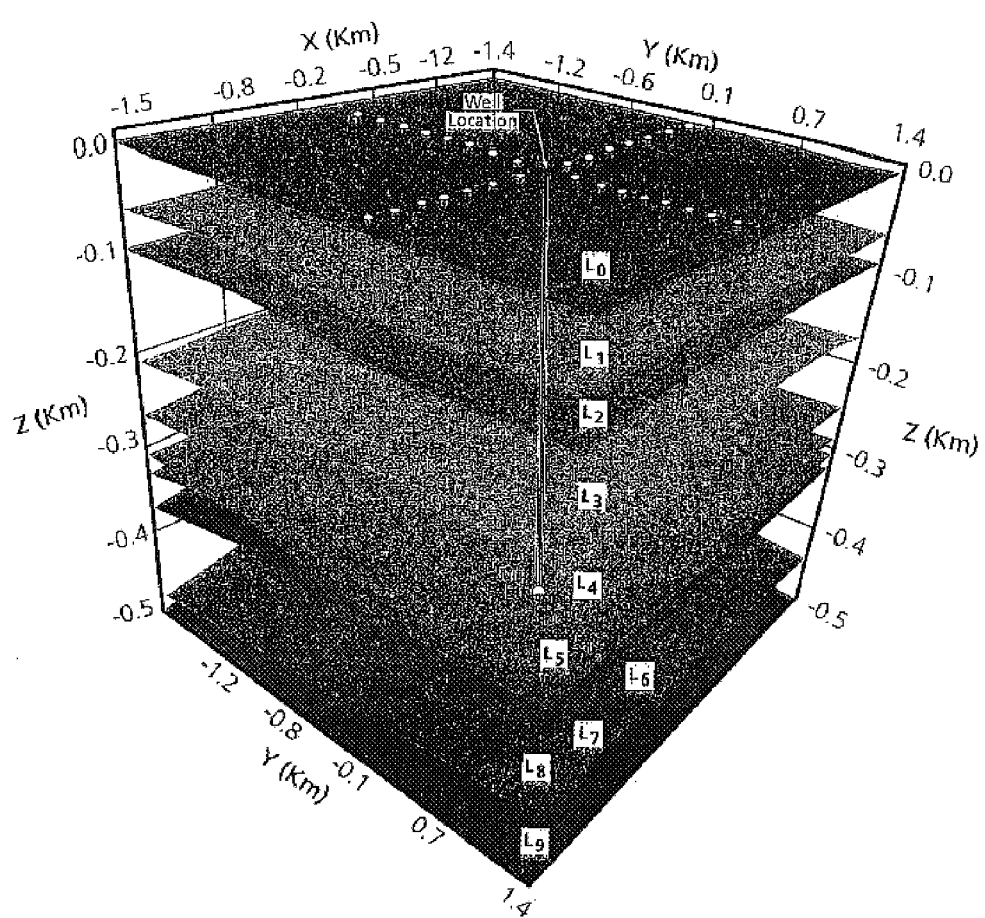
FIG. 9 is a three-dimensional model of near surface layers and surface geometry of SWD.

FIG. 9 displays a three-dimensional model of near surface layers $L_0, L_1, L_2$, SWD source points $S_1, S_2, S_3 \ldots$, the well location and the layout of geophones on ground surface for SWD measurements.

Figure 10:
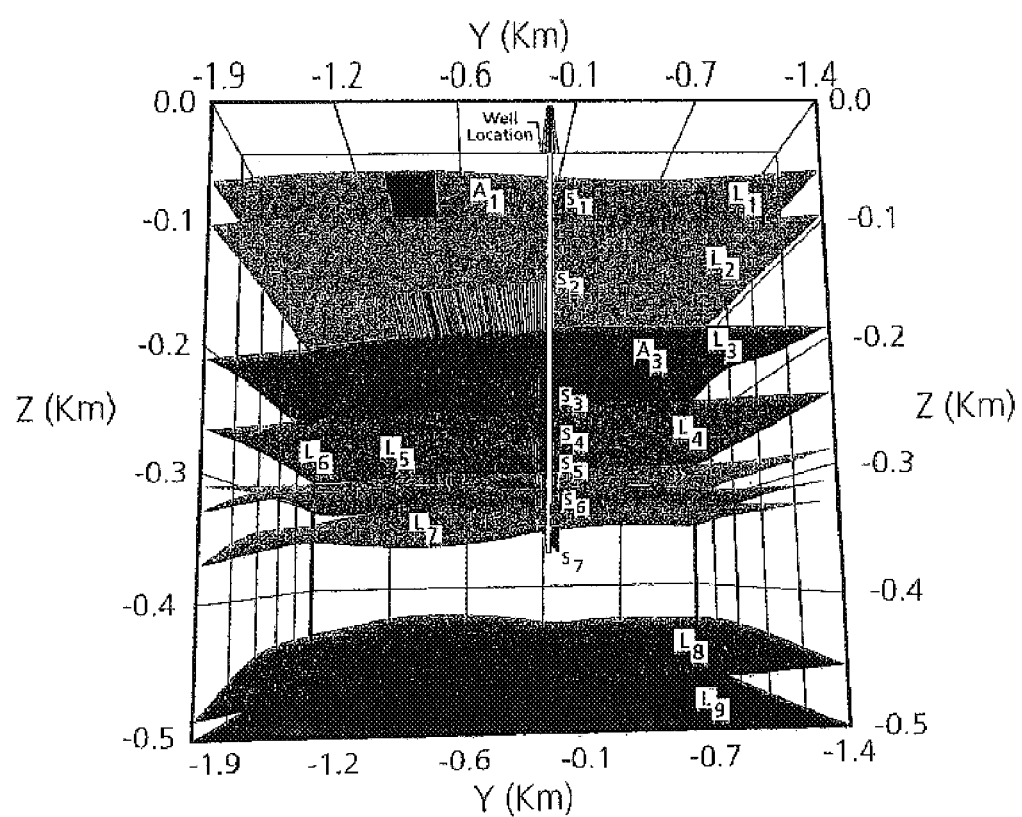
FIG. 10 is a three-dimensional model of near surface layers, seismic wave ray paths from drill bit and velocity anomalies.

FIG. 10 shows a three-dimensional model of near surface layers $L_1, L_2, L_3 \ldots$ and SWD source points $S_1, S_2, S_3 \ldots$ in the well. Velocity anomalies $A_1$ and $A_3$ are visible in layers $L_1$ and $L_3$ in the model. One can see also the ray paths of arrival times of direct P waves transmitted through the near surface layers to each surface geophone. According to the present invention, these events can be used either alone or together with the reflected, refracted and converted arrivals from the P and S waves (not displayed) to the surface geophones within a tomographic inversion to obtain near surface layering and velocities. The interval velocities for the near surface are derived from tomographic inversion of direct arrivals and reflection times and the layout out geometry of the receivers or geophones.

Figure 11:
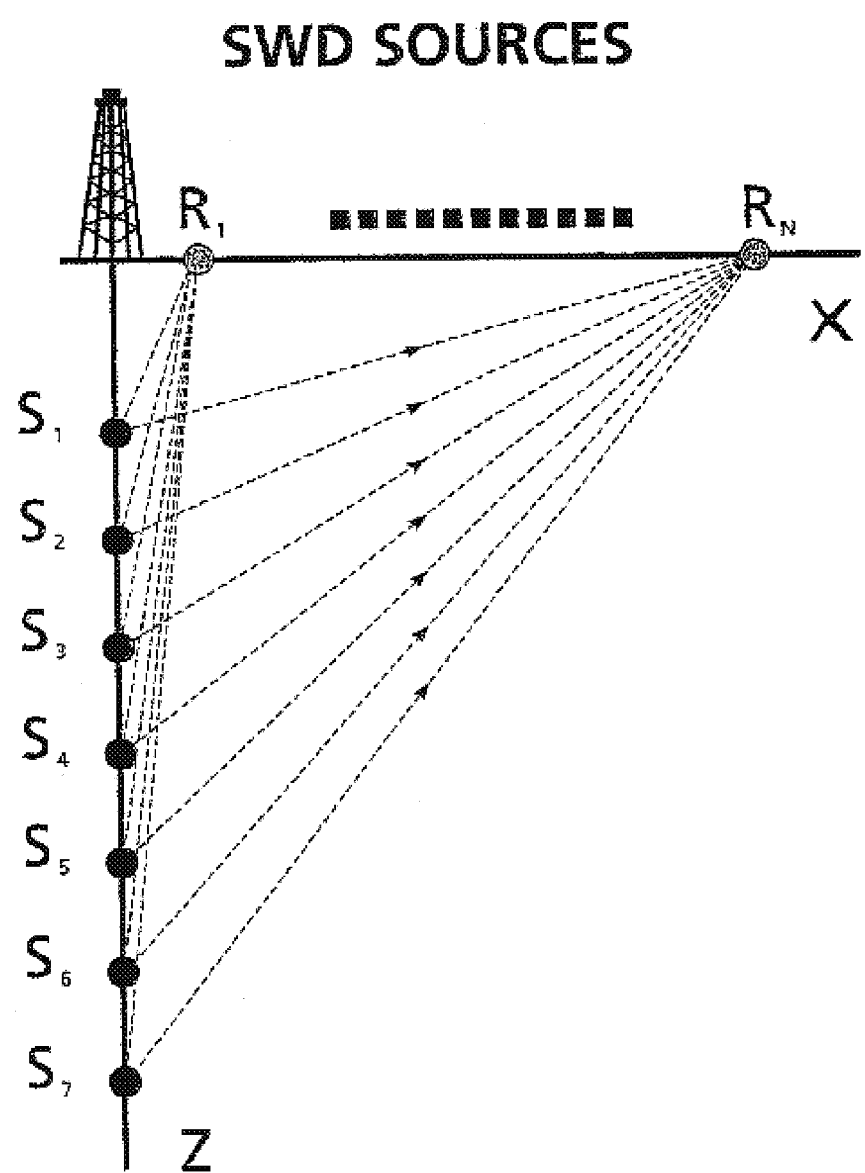
FIG. 11 is a schematic diagram showing the drill bit as seismic source points $S_1$, $S_2$ and receivers $R_1$, $R_2$ on a surface.

FIG. 11 is a schematic showing the drill bit positions as seismic source points $S_1, S_2 \ldots S_7$ in the well, and the receivers $R_1, R_2, \ldots, R_N$ on surface. The source points are successively deeper as the drill bit penetrates into deeper and deeper layers.

Figure 12:
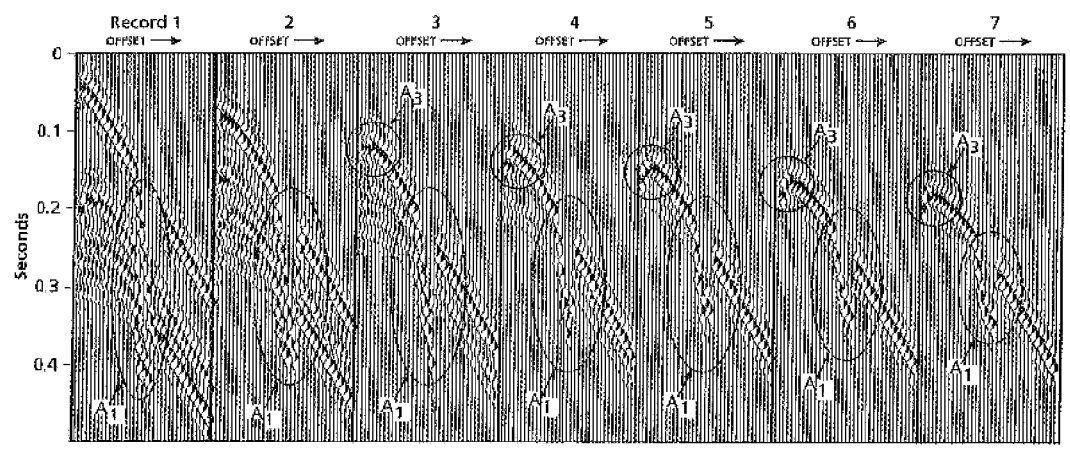
FIG. 12 illustrates modeled seismic response with anomalies $A_1$ and $A_3$.

FIG. 12 is a simulated representation of the corresponding seismic records with anomalies $A_1$ and $A_3$. One can see the direct and reflected arrivals recorded at the surface sensors from layers $L_1$, $L_2$, $L_3$, $L_4$, $L_5$, $L_6$, $L_7$, each successively deeper. In records 1 and 2 there are no distortions of the normal hyperbolic trend of direct arrivals as a function of increasing offset (along the arrow direction). From record 3 to record 7, when the source is within or below the third layer, these delays become evident and are due to the waves' propagation across anomaly $A_3$. For the same reason, there is a major delay for both direct and reflected arrivals in the middle-range offsets, because all come from ray paths that crossed the shallowest anomaly A1 in the first layer.

The inversion of this delay as a function of source and receiver coordinates allows the computation of the local velocities within the shallow layers. In the most general case, the arrival times for direct, reflected, refracted and converted waves of all geophones that are spatially distributed in a layout are used in tomographic inversion algorithms for the near surface model at the well location. Similar measurements at several wells over an area are used in tomographic inversion for deriving a 3D near surface model for the area.

Figure 13:
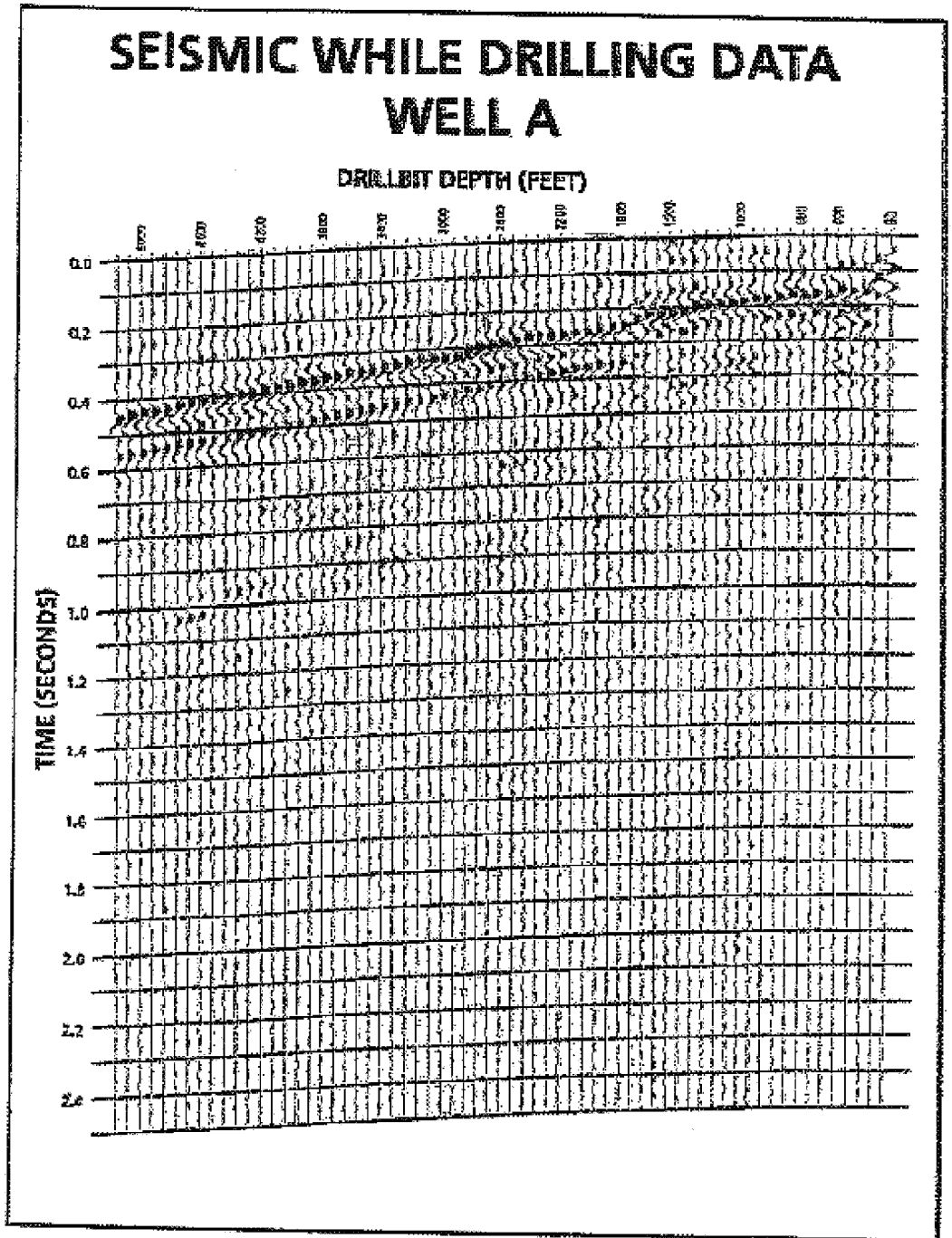
FIG. 13 shows recorded SWD field data in a drilling well A.

FIG. 13 shows a record from a SWD measurement in a drilling well A. The data shows the direct arrivals and some reflection events. The traces correspond to depth points below the surface.

Figure 14:
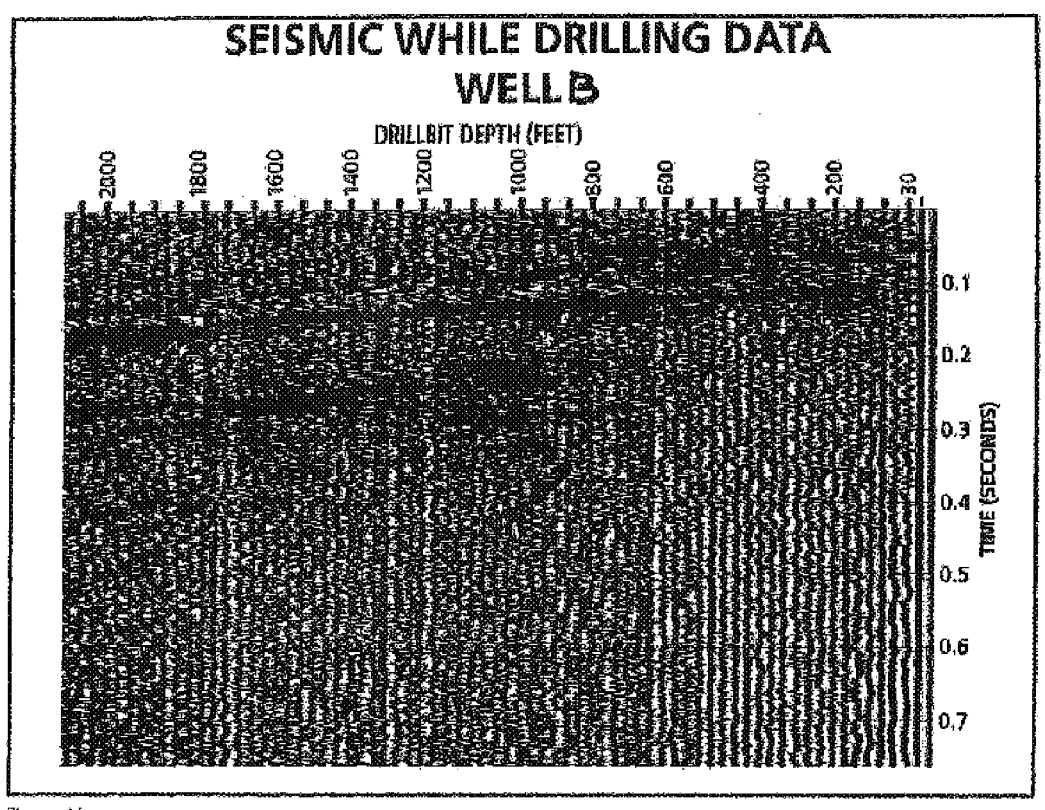
FIG. 14 shows recorded SWD field data in a drilling well B.

FIG. 14 shows a field record from a SWD measurement is a drilling well B. The data shows the direct arrival events and some reflection events. The traces are corresponding to depth points below the surface.

A brief description of a known tomographic inversion algorithm will now be provided. It will be understood that such algorithms are themselves well known, but their use as described in connection with the present invention is novel.

To begin, the Earth and its near surface can be represented by adjacent blocks with an arbitrary irregular shape and size, but internally homogeneous. In this case, the paths of any wave across each of them are straight lines, and each entire source-to-receiver ray path is composed of segments. The total travel time $t_j$ for the j-th source-receiver couple is thus just a summation:

$$t_j = \sum_i s_i l_{ij} \qquad (1)$$

where $l_{ij}$ is the length of the path of j-th ray in the i-th block, and $s_i$ is the slowness (inverse to velocity) in that block. Representing travel times $t_j$ as elements of vector t, and slowness values $s_i$ as elements of vector s, equation (1) may be written as a matrix product in equation (2):

$$t = Ls \qquad (2)$$

where matrix L elements are the segment lengths $l_{ij}$. The inversion of Matrix L provides the estimate for the slowness vector, and thus the velocity field in the investigated area.

The numerical solution of equation (2) may be obtained by the iterative SIRT approach, applying the formula:

$$s_i^{(n+1)} = s_i^{(n)} + (1/R_i) \sum_j \left\{ l_{ij}(t_j^{(n)} - t_j) / \left[ \sum_k l_{ik}^2 \right] \right\} \qquad (3)$$

where $t_{j(n)}$ is the estimated travel time along the j-th ray path, using the slowness vector $s^{(n)}$ obtained at the n-th iteration, and $R_j$ is the number of rays passing through the j-the block. At the first iteration, the slowness vector $s^{(0)}$ is just an hypothesis, which can be very far from the real values, for a proper choice of the tomographic block discretization. The number of iterations is decided by the user, according to the difference between estimated and picked travel times.

While the disclosed method has been particularly shown and described with respect to the preferred embodiments, it is understood by those skilled in the art that various modifications in form and detail may be made therein without departing from the scope and spirit of the invention. Accordingly, modifications such as those suggested above, but not limited thereto are to be considered within the scope of the invention, which is to be determined by reference to the appended claims.

We claim:

1. A method for measuring velocity pertaining to the weathered and/or subweathered layers in the earth using travel times of a plurality of different waves, generated by a drill bit while drilling a borehole using a drill string, said method comprising the steps of:

recording vibration data by locating seismic energy from the drill bit as the drill bit penetrates through rock layers in the near surface of the earth near the borehole using three-component seismic sensors deployed on the ground surface and the drill string;

cross-correlating the vibration data recorded on sensors mounted on the drill string and the ground surface;

identifying, in the cross-correlated vibration data, reflected, refracted and converted waves so as to measure a travel time of each identified wave;

performing a joint tomographic inversion of the travel times of the vibration data using each measured travel time to develop a near surface replacement model; and applying the near surface replacement model to correct surface seismic data in three dimensions.

2. The method of claim 1, wherein said recording step includes the step of receiving the vibration data from a plurality of the three-component geophones that are laid out in a regular pattern on the ground surface and on the drill string of a drilling well.

3. The method of claim 2, wherein the regular pattern is a rectangular grid disposed around the well.

4. The method of claim 2, wherein the regular pattern is a radial grid disposed around the well.

5. The method of claim 1, wherein said performing step interprets the identified waves to measure at least one of local velocity, structure, layer thickness and depth of the rock layers penetrated by the drill bit.

6. The method of claim 5, wherein the measured velocities of the near surface layers at the location of the well are used with velocities from other well surveys in the area to compute an accurate picture of a velocity field of the near surface in three dimensions.

7. The method of claim 6, wherein the velocities from the other surveys include velocities measured at upholes.

8. The method of claim 1, wherein the near surface replacement model is used to compute a replacement statics solution for the area under survey, to correct for long period residual statics errors in seismic data.

9. The method of claim 1, wherein said performing step uses a distribution of available ray paths, related Fresnel volumes, null space energy obtained by Singular Value Decomposition and covariance analysis, jointly or separately, for adapting an irregular grid in the tomographic inversion of available travel times from waves generated by a working drill bit.

10. Apparatus for measuring velocity pertaining to the weathered and/or subweathered layers in the earth using travel times of a plurality of different waves, generated by a drill bit while drilling a borehole using a drill string, said apparatus comprising:

means for recording vibration data by locating seismic energy from the drill bit as the drill bit penetrates through rock layers in the near surface of the earth near the borehole using three-component seismic sensors deployed on the ground surface and the drill string;

means for cross-correlating the vibration data recorded on sensors mounted on the drill string and the ground surface;

means for identifying, in the cross-correlated vibration data, direct, reflected, refracted and converted waves so as to measure a travel time of each identified wave;

means for performing a joint tomographic inversion of the travel times of the vibration data using each measured travel time to develop a near surface replacement model; and means for applying the near surface replacement model to correct surface seismic data in three dimensions.

11. The apparatus of claim 10, wherein said recording means includes means for receiving the vibration data from a plurality of the three-component geophones that are laid out in a regular pattern on the ground surface and on the drill string of a drilling well.

12. The apparatus of claim 11, wherein the regular pattern is a rectangular grid disposed around the well.

13. The apparatus of claim 11, wherein the regular pattern is a radial grid disposed around the well.

14. The apparatus of claim 10, wherein said performing means interprets the identified waves to measure at least one of local velocity, structure, layer thickness and depth of the rock layers penetrated by the drill bit.

15. The apparatus of claim 14, wherein the measured velocities of the near surface layers at the location of the well are used with velocities from other well surveys in the area to compute an accurate picture of a velocity field of the near surface in three dimensions.

16. The apparatus of claim 15, wherein the velocities from the other surveys include velocities measured at upholes.

17. The apparatus of claim 10, wherein the near surface replacement model is used to compute a replacement statics solution for the area under survey, to correct for long period residual statics errors in seismic data.

18. The apparatus of claim 10, wherein said performing means uses a distribution of available ray paths, related Fresnel volumes, null space energy obtained by Singular Value Decomposition and covariance analysis, jointly or separately, for adapting an irregular grid in the tomographic inversion of available travel times from waves generated by a working drill bit.

* * * * *